United States Patent
Wishneusky et al.

(10) Patent No.: US 7,847,964 B2
(45) Date of Patent: Dec. 7, 2010

(54) DOCUMENT DELIVERY SYSTEM

(75) Inventors: Adam D. Wishneusky, Troy, NY (US);
Neil E. Grabowsky, Troy, NY (US)

(73) Assignee: Celery, LLC, Troy, NY (US)

( * ) Notice: Subject to any disclaimer, the term of this patent is extended or adjusted under 35 U.S.C. 154(b) by 1447 days.

(21) Appl. No.: 11/256,027

(22) Filed: Oct. 21, 2005

(65) Prior Publication Data

US 2006/0279796 A1     Dec. 14, 2006

Related U.S. Application Data

(60) Provisional application No. 60/690,203, filed on Jun. 14, 2005.

(51) Int. Cl.
*G06F 15/00* (2006.01)
*G06F 15/16* (2006.01)
(52) U.S. Cl. ..................... 358/1.15; 709/206
(58) Field of Classification Search ............. 358/1.15, 358/402, 403, 442, 448, 1.16, 474, 400, 440; 709/206, 207, 229, 245; 370/352, 466; 379/88.03, 379/355.01, 88.13; 704/260, 231, 235, 246, 704/270
See application file for complete search history.

(56) References Cited

U.S. PATENT DOCUMENTS

| | | |
|---|---|---|
| 5,331,431 A | 7/1994 | Jasinski |
| 5,375,229 A | 12/1994 | Liccese et al. |
| 5,438,433 A | 8/1995 | Reifman et al. |
| 5,461,488 A | 10/1995 | Witek |
| 5,548,814 A | 8/1996 | Lorang et al. |
| 5,550,614 A | 8/1996 | Motoyama |
| 5,902,353 A | 5/1999 | Reber et al. |
| 5,903,729 A | 5/1999 | Reber et al. |
| 5,956,681 A * | 9/1999 | Yamakita ............... 704/260 |
| 5,974,447 A | 10/1999 | Cannon et al. |
| 6,141,341 A | 10/2000 | Jones et al. |
| 6,366,698 B1 | 4/2002 | Yamakita |
| 6,404,764 B1 | 6/2002 | Jones et al. |
| 6,442,591 B1 * | 8/2002 | Haynes et al. ........... 709/206 |
| 6,522,790 B1 | 2/2003 | Zhang et al. |
| 6,594,503 B1 | 7/2003 | Herzig et al. |
| 6,697,165 B2 | 2/2004 | Wakal et al. |

(Continued)

FOREIGN PATENT DOCUMENTS

JP     62038664     2/1987

(Continued)

OTHER PUBLICATIONS

Olivetti—Ink Jet Fax, Fax-Lab 220/270—Instructions, XP-002479932, Copyright 2003, 50 pgs.

*Primary Examiner*—Saeid Ebrahimi Dehkordy
(74) *Attorney, Agent, or Firm*—Schiff Hardin LLP

(57) ABSTRACT

A mail terminal senses insertion of a document into the terminal, scans the document in response to the sensed document insertion, and transmits the scanned document electronically over a telephone network. A host server receives the document over the telephone network, determines the name of the addressee from the received document, looks up document delivery instructions stored in a memory in association with the name of the addressee, and delivers the document to the addressee according to the delivery instructions. The mail terminal also prints documents that it receives from the host server.

15 Claims, 18 Drawing Sheets

System 1: client / server interaction

U.S. PATENT DOCUMENTS

| | | |
|---|---|---|
| 6,742,161 B1 | 5/2004 | James et al. |
| 6,813,649 B2 | 11/2004 | Ogle |
| 6,906,817 B1 * | 6/2005 | Berard et al. ............... 358/1.15 |
| 2001/0047391 A1 * | 11/2001 | Szutu ......................... 709/206 |
| 2003/0020959 A1 * | 1/2003 | Henry ........................ 358/402 |
| 2004/0049556 A1 | 3/2004 | Watanabe |
| 2004/0186896 A1 * | 9/2004 | Daniell et al. ............... 709/207 |
| 2004/0251913 A1 | 12/2004 | Pharn et al. |
| 2005/0128514 A1 * | 6/2005 | Wanda et al. ............... 358/1.15 |
| 2005/0198180 A1 * | 9/2005 | Khanolkar et al. .......... 709/206 |

FOREIGN PATENT DOCUMENTS

| | | |
|---|---|---|
| JP | 63232570 | 9/1988 |
| JP | 3 262268 | 11/1991 |
| JP | 2002344690 | 11/2002 |

* cited by examiner

System 1: client / server interaction host server 5: internal hardware

Web Screen 34: Main Page

Web Screen 35: Info Page

Web Screen 36: Signup Page

Web Screen 37: Signup Page

Web Screen 38: Signup Page

Messaging

Get in the loop with email communications.
Fill out the form below to get started.

Credit card number: [_____]
Card type: [Visa ▼]
Expiration date: Month [01 ▼] Year [2003 ▼]
[submit]

Signup

Info

Signup

Account  0100 1101 0111

(about) (sign up) (your account) (contact)

Figure 10

Web Screen 39: Account Settings

Messaging

Account settings        fransmith@ezmail.com

Fran Smith
183 Main St
Lancaster, MA 01523          [edit profile]

font size of printed emails:   [12 point ▼]

Address Book                 [edit address book]

When out of paper:           [deliver and charge ▼]
When out of ink:             [deliver and charge ▼]

[save changes]

Account

Info

Signup

Account  0100 1101 0111

(about) (sign up) (your account) (contact)

Figure 11

Web Screen 40: Account Profile

Account Profile fransmith@ezmail.com full name: Fran Smith
address: 183 Main St
city: Lancaster
state: MA
zip-code: 01523

[save changes]

Account
Info
Signup
Account 0100 1101 0111

(about) (sign up) (your account) (contact)

Figure 12

Web Screen 41: Address Book

Address Book fransmith@ezmail.com

Bob Smith
bob@foo.com
123-456-7890    [edit]

Patty Jonson
foo@yahoo.com
123-555-1234    [edit]

name:
email:          [add]
phone:

[save changes]

Account
Info
Signup
Account 0100 1101 0111

(about) (sign up) (your account) (contact)

Figure 13

Client Program 14: detection or low ink and paper conditions

Client Program 15: "Relo-rec"

Client Program 17: unit receives a message
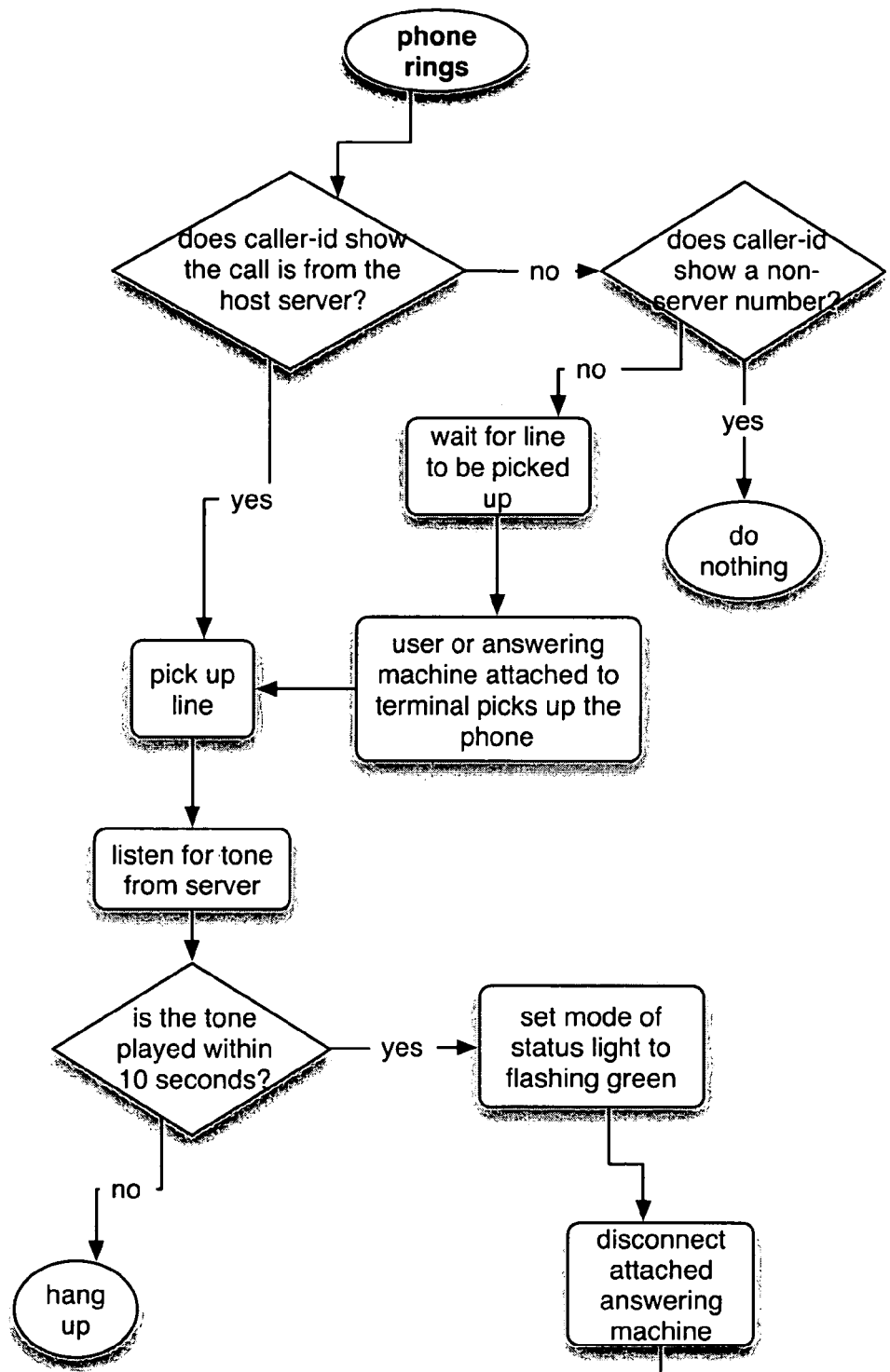
Figure 17 (page 1 of 2)

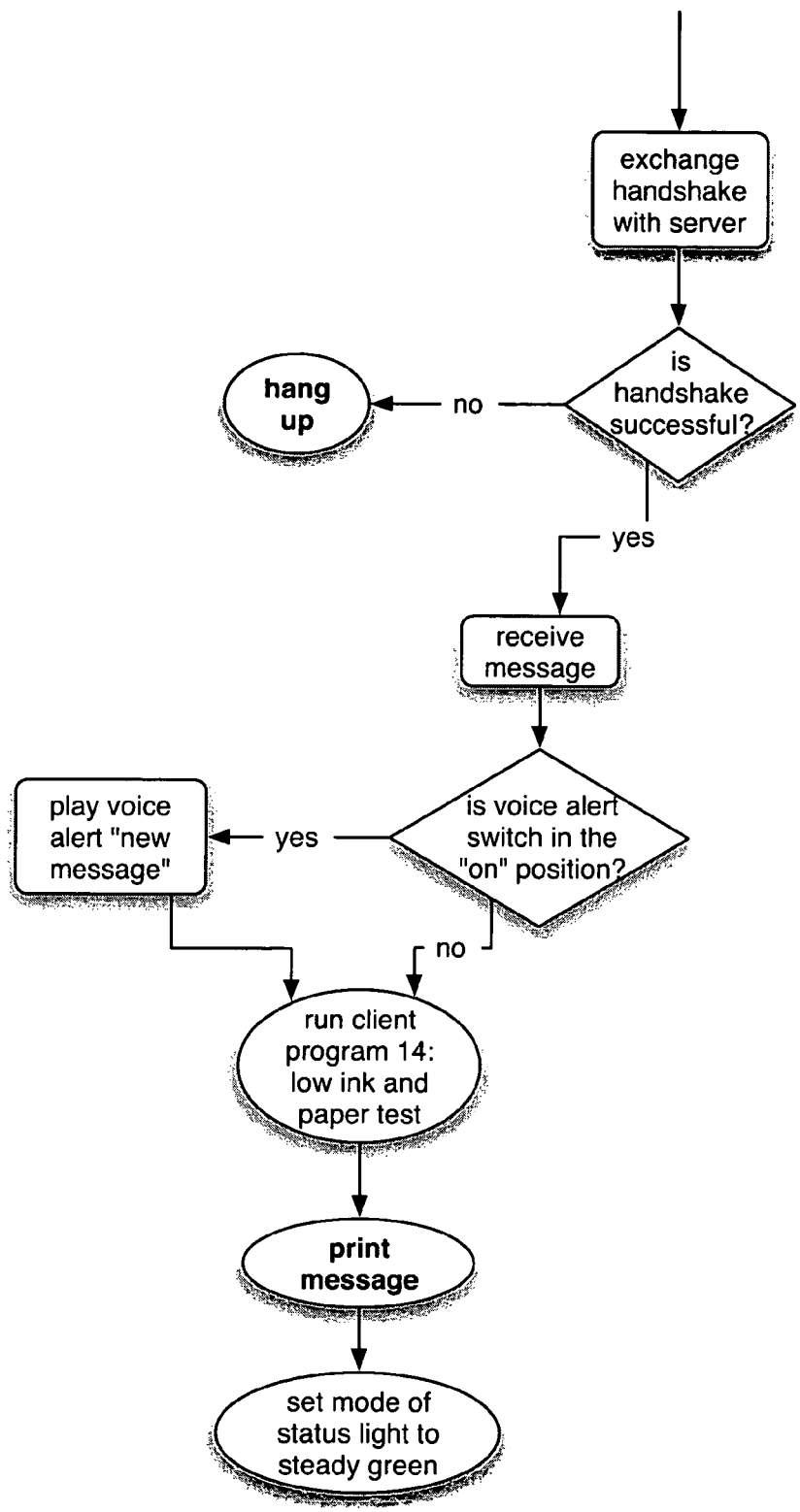
Figure 17 (page 2 of 2)

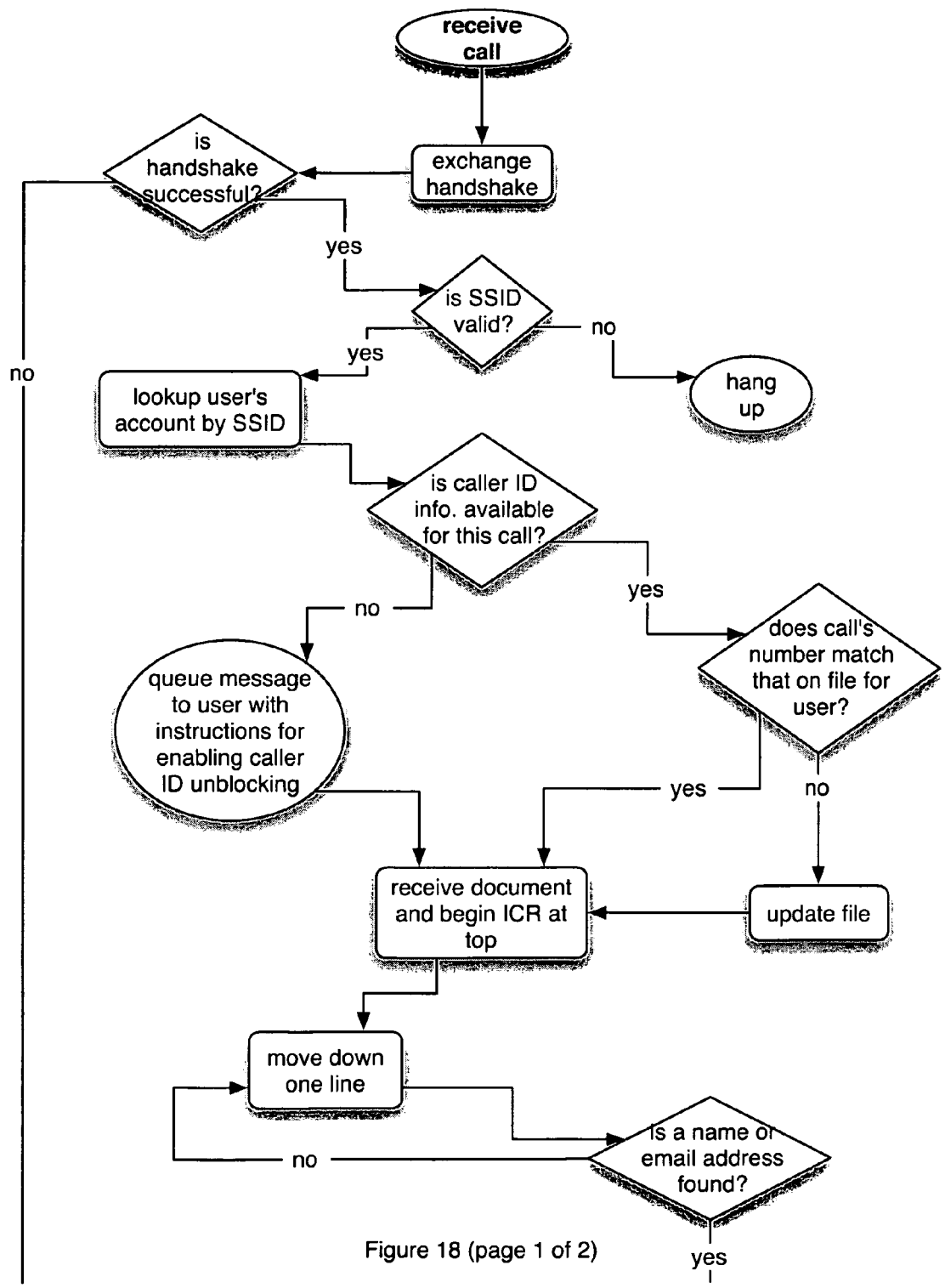
Figure 18 (page 1 of 2)

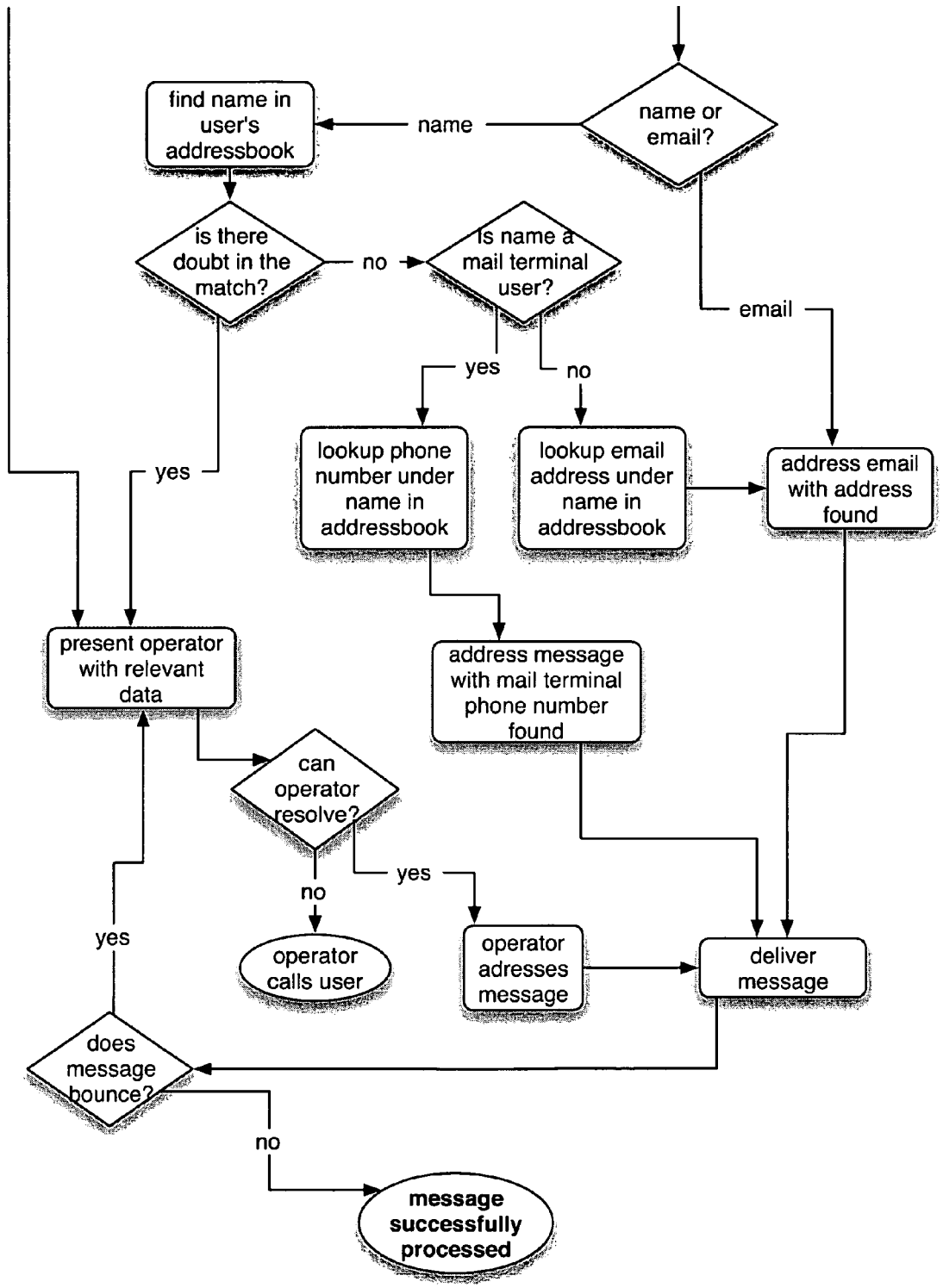
Figure 18 (page 2 of 2)

Optional Enhancements
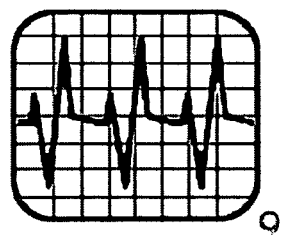
42: vitals monitor
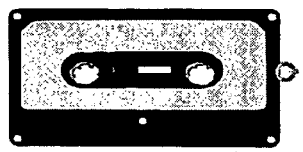
43: answering machine
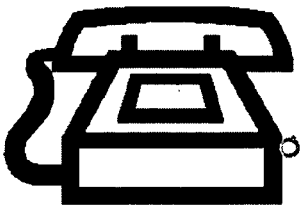
43: phone
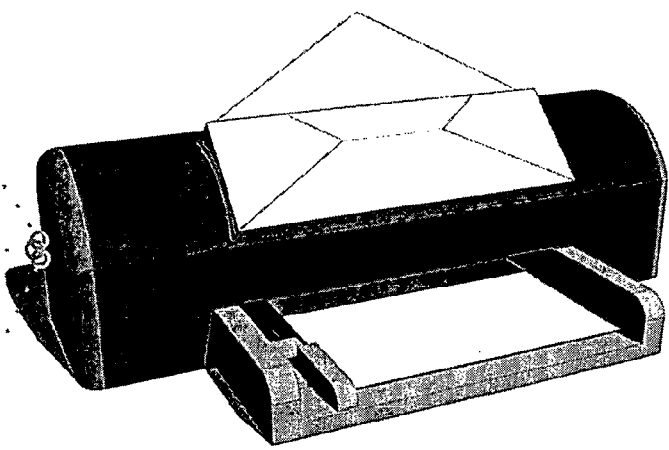
2: mail terminal
Figure 20

DOCUMENT DELIVERY SYSTEM

RELATED APPLICATION

This application claims the benefit of U.S. Provisional Application No. 60/690,203, filed Jun. 14, 2005.

TECHNICAL FIELD OF THE INVENTION

The present invention relates to the delivery of documents and, more particularly, to the delivery of documents through a system that does not require a high degree of skill of the user.

BACKGROUND OF THE INVENTION

A typical document delivery system in use today is e-mail. E-mail is an efficient and popular way to communicate and, therefore, has become an important part of nearly every home, business, and institution.

During creation of an e-mail, the sender typically inserts a message and one or more addresses into the e-mail. The message may be in the form of text, graphics, and/or other forms of communication. The address takes the following form:

recipient@organization.domainextension where the recipient is the person to receive the e-mail, and the remainder of the address is the domain name. The organization in the domain name may be an Internet Service Provider or other organization such as a business or institution, and the .domainextension portion of the domain name is usually referred to as the top level domain or sometimes the domain extension. Examples of domain extensions are .com, org, .gov, and .edu.

Remembering e-mail addresses can be a difficult task, especially for those who are uncomfortable with using computers. Most E-mail programs have address books that store e-mail addresses by the person's names, but even then such e-mail features can still be vexing to the reluctant computer user. Therefore, due to such complexities and also due to the non-intuitive nature of computer interfaces, many people are discouraged from using e-mail as a form of communication. These issues might be acceptable except that so many people have adopted e-mail as a common form of communication.

Thus, most people today use e-mail not only regularly, but also aggressively. People use it to schedule appointments, to communicate with friends and loved ones, and in the conduct of business. But there are those who do not use computers or do so only reluctantly.

Therefore, there is a need for devices that permit such people to communicate electronically.

U.S. Pat. No. 6,366,698 discloses a portable terminal that takes an image of a document (such as a handwritten document), and sends the image in a file to a host device. The user is required to provide an address on the document in a preset format. The preset format includes a command, a predetermined indicator, and a destination.

The command indicates a processing instruction to the host device. The command indicates that the document is to be transmitted by e-mail or facsimile or that any mail should be delivered electronically by the host device to the portable terminal. The predetermined indicator is used to uniquely designate the address as an address. The predetermined indicator can be underlining, brackets, or colors. The destination indicates the recipient of the document and can be a facsimile telephone number or an e-mail address.

When the host device receives a document, it determines whether the received document is e-mail or a fax. If it is either, the host device stores the received e-mail or fax using the destination as a key. If the received document is neither e-mail nor a fax, the host device executes pattern recognition to read the command, destination, and predetermined indicators on the received document. The host device determines whether the service requested by the user is e-mail or facsimile transmission. If so, the document is e-mailed or faxed to the specified destination.

It is apparent from the above description that the user is required to provide an address in a complicated and counter-intuitive format. Reluctant computer users or those who do not use computers at all will not find such a system easy to use and will desire a more user-friendly terminal and service.

The present invention solves one or more of these and/or other problems.

SUMMARY OF THE INVENTION

According to one aspect of the present invention, a phone mail terminal comprises a sensor, a scanner, and a transmitter. The sensor is arranged to sense application of a document to the terminal so as to output a sensor document insertion signal. The scanner is responsive to the sensor document insertion signal so as to convert the document to an electronic document. The transmitter automatically transmits the electronic document electronically over a telephone line.

According to another aspect of the present invention, a phone mail server comprises a receiver, an intelligent character reader, a processor, and a transmitter. The receiver receives an electronic document over a telephone line. The intelligent character reader reads a recipient's name on the electronic document. The processor converts the name of the recipient read by the intelligent character reader to an address of the recipient. The transmitter transmits the electronic document to the address of the recipient.

According to still another aspect of the present invention, a document delivery method comprises the following: sensing presence of a document to be scanned; scanning the document in response to the document presence sensing; and, transmitting the scanned document electronically over a telephone network to a predetermined fixed telephone number.

According to yet another aspect of the present invention, a phone mail terminal comprises a housing, a scanner, and a transmitter. The housing has an input slot for a receiving document to be transmitted by the phone mail terminal to a remote terminal, and the slot is in the shape of an open envelope. The scanner is in the housing and converts the document to an electronic document. The transmitter is in the housing and transmits the electronic document to the remote terminal.

BRIEF DESCRIPTION OF THE DRAWINGS

These and other features and advantages will become more apparent from a detailed consideration of the invention when taken in conjunction with the drawings in which:

FIGS. 6-13 illustrate screen displays that are used to enter appropriate information related to the use of the mail terminal shown in FIGS. 2 and 3;

FIGS. 14-17 are flow charts illustrating programs that can be executed by the mail terminal of FIGS. 2 and 3;

FIGS. 18 and 19 are flow charts illustrating programs that can be executed by the host server of FIG. 1; and, FIG. 20 illustrates enhancements that can be provided to the mail terminal shown in FIGS. 2 and 3.

DETAILED DESCRIPTION

Figure 1:
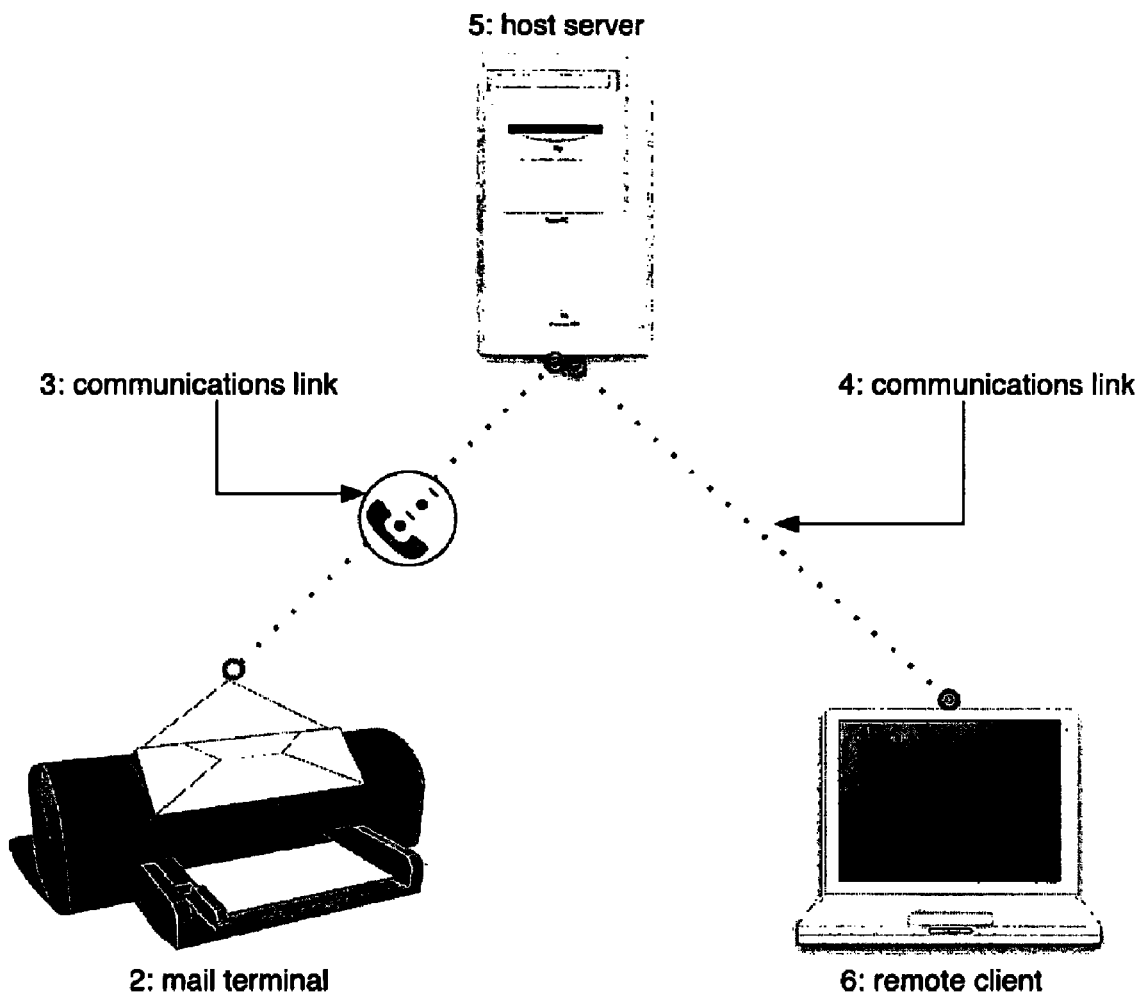
FIG. 1 illustrates a communication system according to an embodiment of the present invention.
Figure 2:
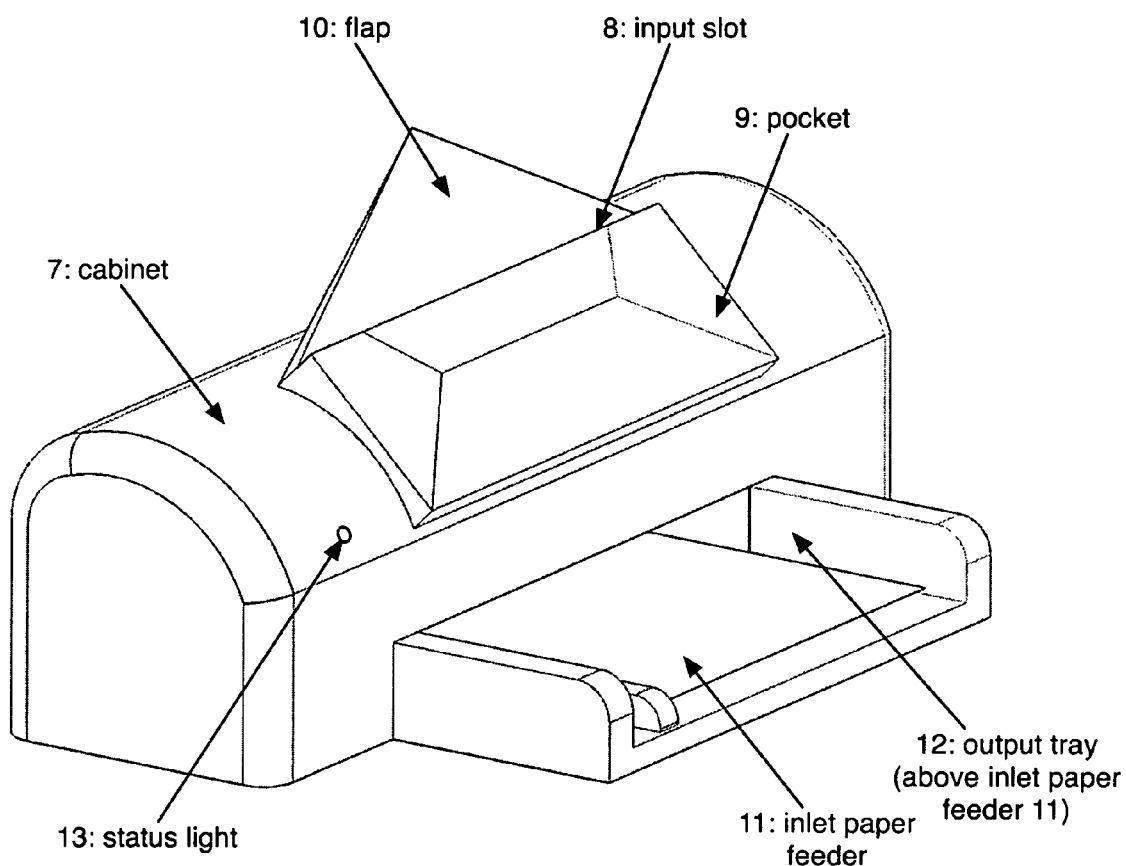
FIGS. 2 and 3 illustrate an example of a mail terminal that can be used in the communication system of FIG. 1.
Figure 3:
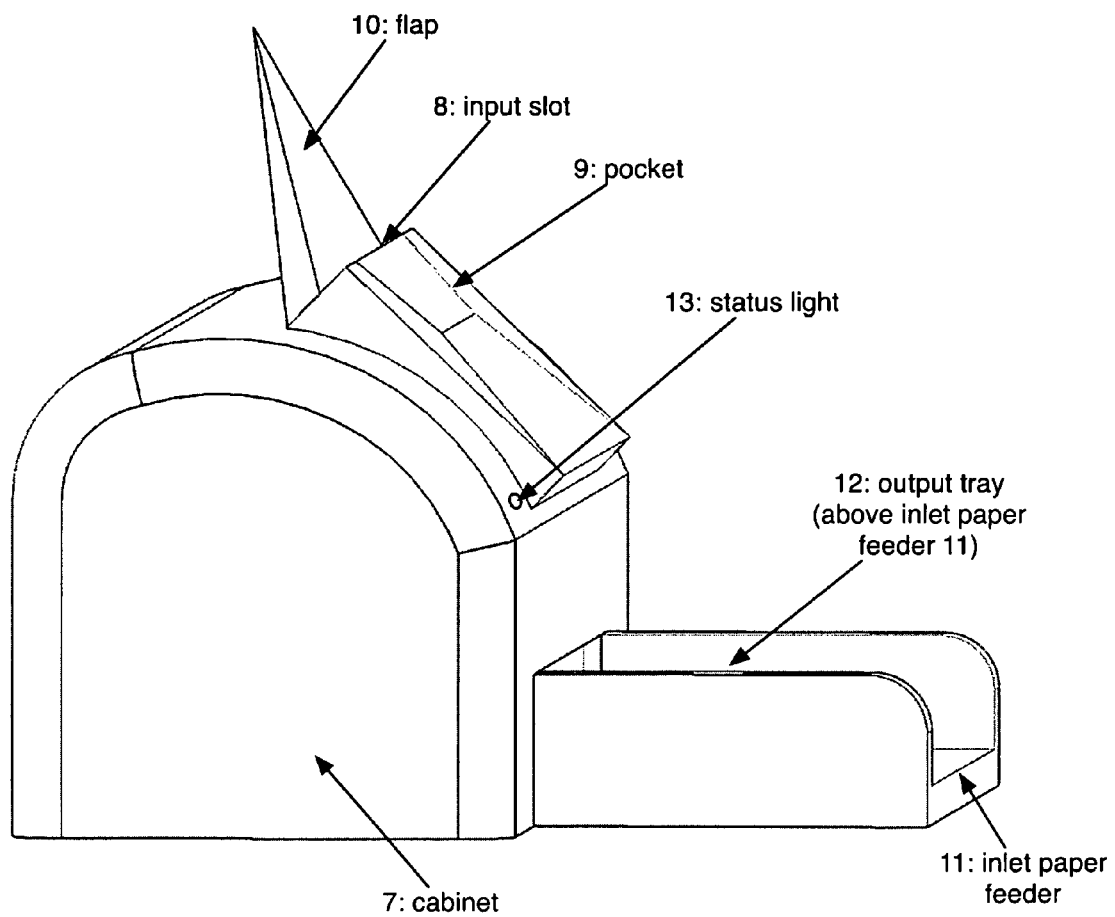

As shown in FIG. 1, the communication system 1 according to an embodiment of the present invention includes a mail terminal 2 that is coupled by a communication link 3 to a host server 5. An example of the mail terminal 2 is shown in FIGS. 2 and 3. The communication link 3, for example, may be a telephone network through which the mail terminal 2 and the host server 5 communicate with each other. The host server 5, for example, may be computer capable of executing programs at least some of which are disclosed herein in flow chart form.

The communication system 1 also includes a remote client 6 which communicates with the host server 5 over a communication link 4. As in the case of the communication link 3, the communication link 4, for example, may be a telephone network through which the remote client 6 and the host server 5 communicate with each other. Communication link 4 can also be a TCP/IP connection via the Internet. Although the remote client 6 is shown in FIG. 1 as a computer, the remote client 6 can be a mail terminal similar to the mail terminal 2, a facsimile machine, or other device capable of receiving communications from the host server 5. In one embodiment, the remote client 6 may be a computer capable of receiving e-mail from the host server 5, in which case the host server 5, when receiving a message from the mail terminal 2, forwards the message as an e-mail to the remote client 6. In this event, the communication link 4 may include an Internet Server Provider.

As shown in FIGS. 2 and 3, the mail terminal 2 includes a cabinet 7 supporting an envelope shaped slot 8 to receive documents containing messages to be forwarded to an addressee. The envelope shaped slot 8 includes a pocket portion 9 and a flap portion 10 configured as an envelope whose flap is open as if to receive a letter or other document to be conventionally mailed to the addressee. Thus, the envelope shaped slot 8 is shaped so as to give the impression of conventionally mailing a letter when the document is inserted. For example, the envelope shaped slot 8 may be modeled after a #10 envelope with address markings to show the users that it is the envelope into which they insert their outgoing mail. Accordingly, the mail terminal 2 is configured so that its use is intuitive. A status light 13 indicates the current operation of the mail terminal 2 to the user through four states: steady green, flashing green, steady red, and flashing red.

The mail terminal 2 also has an inlet paper feeder 11 and a outlet paper tray 12. The inlet paper feeder 11 holds paper that can be printed with messages received by the mail terminal 2 from the host server 5. Such messages can be from another mail terminal 2 or from a remote client 6 or can be administrative messages sent by the host server 5 regarding use of the mail terminal 2 or of the service provided by the communication system 1.

The outlet paper tray 12 holds the document that is fed through the envelope shaped slot 8 and that contains a message to be sent to an addressee. Accordingly, when the user inserts a document into the envelope shaped slot 8, the mail terminal 2 scans the message on the document and feeds the document to the outlet paper tray 12. The mail terminal 2 sends the scanned message to the host server 5 over the communication link 3. Any messages received by the mail terminal 2 from the host server 5 are printed on one or more sheets of paper held in the inlet paper feeder 11, and the mail terminal 2 feeds these printed sheet or sheets to the outlet paper tray 12.

Figure 4:
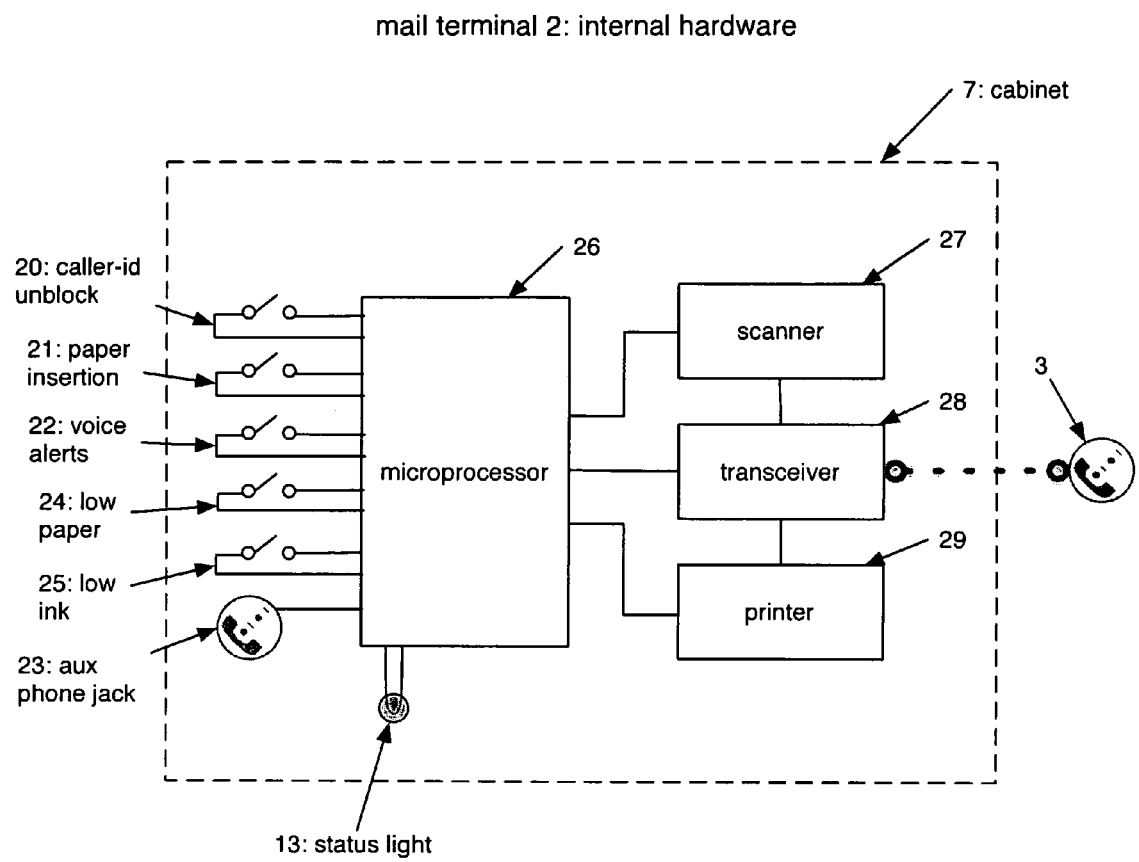
FIG. 4 illustrates the hardware components of the mail terminal shown in FIGS. 2 and 3.

As shown in FIG. 4, the cabinet 7 of the mail terminal 2 houses at least a microprocessor 26, a sensor 21, a scanner 27, a transceiver 28, a printer 29, a low-ink sensor 25, a low-paper sensor 24, a caller ID unblocking switch 20, and a voice alerts switch 22. The voice alerts switch 22 determines whether voice alerts are played during operation of the mail terminal 2. The caller ID unblocking switch 20 determines whether *82 is dialed before all outgoing calls to unblock caller-id. A phone jack 23 is supported by the cabinet 7 and allows the user to connect a phone or answering machine to the mail terminal. The phone jack 23 is disconnected from the phone line whenever the microprocessor 26 determines that a mail terminal message is incoming. The sensor 21, for example, may be an optical sensor or other device that, upon sensing a document inserted into the envelope shaped slot 8, provides an interrupt or other signal to the microprocessor 26.

In response to the interrupt or other signal, the microprocessor 26 instructs the scanner 27 to scan the document that has been inserted into the envelope shaped slot 8. The transceiver 28 automatically dials the phone number of the host server 5 and, upon connection to the host server 5, transmits the scanned document through the communication link 3 to the host server 5. The mail terminal 2 then resets and is ready to repeat the cycle.

The transmission of the document from the mail terminal 2 to the host server 5 is similar to facsimile transmission. Indeed, the microprocessor 26, the scanner 27, the transceiver 28, and the printer 29 may be in the form of a conventional facsimile machine programmed as indicated herein.

When a message is received from the host server 5 by the transceiver 28, the received message is printed by the printer 29 on a piece of paper fed from the inlet paper feeder 11, and the printed piece of paper is fed on to the outlet paper tray 12.

Accordingly, the mail terminal 2 replaces more technologically advanced interfaces with a very intuitive, very familiar interface. Users believe that they are writing conventional letters. A person using the mail terminal 2 simply writes a conventional letter either by hand or by a typewriter on a piece of paper. The person addresses the letter in standard written form with the full name of the recipient (John Doe) or in e-mail form (someone@somwhere.com). Below the addressee, the user writes the body of the letter. The person then slips the letter into the envelope shaped slot 8 of the mail terminal 2. The mail terminal 2 electronically scans the letter and sends it to the recipient through the host server 5. As in the case of conventional e-mail, the time needed for the letter to arrive at its destination is only seconds whereas conventional mail takes days.

Figure 19:
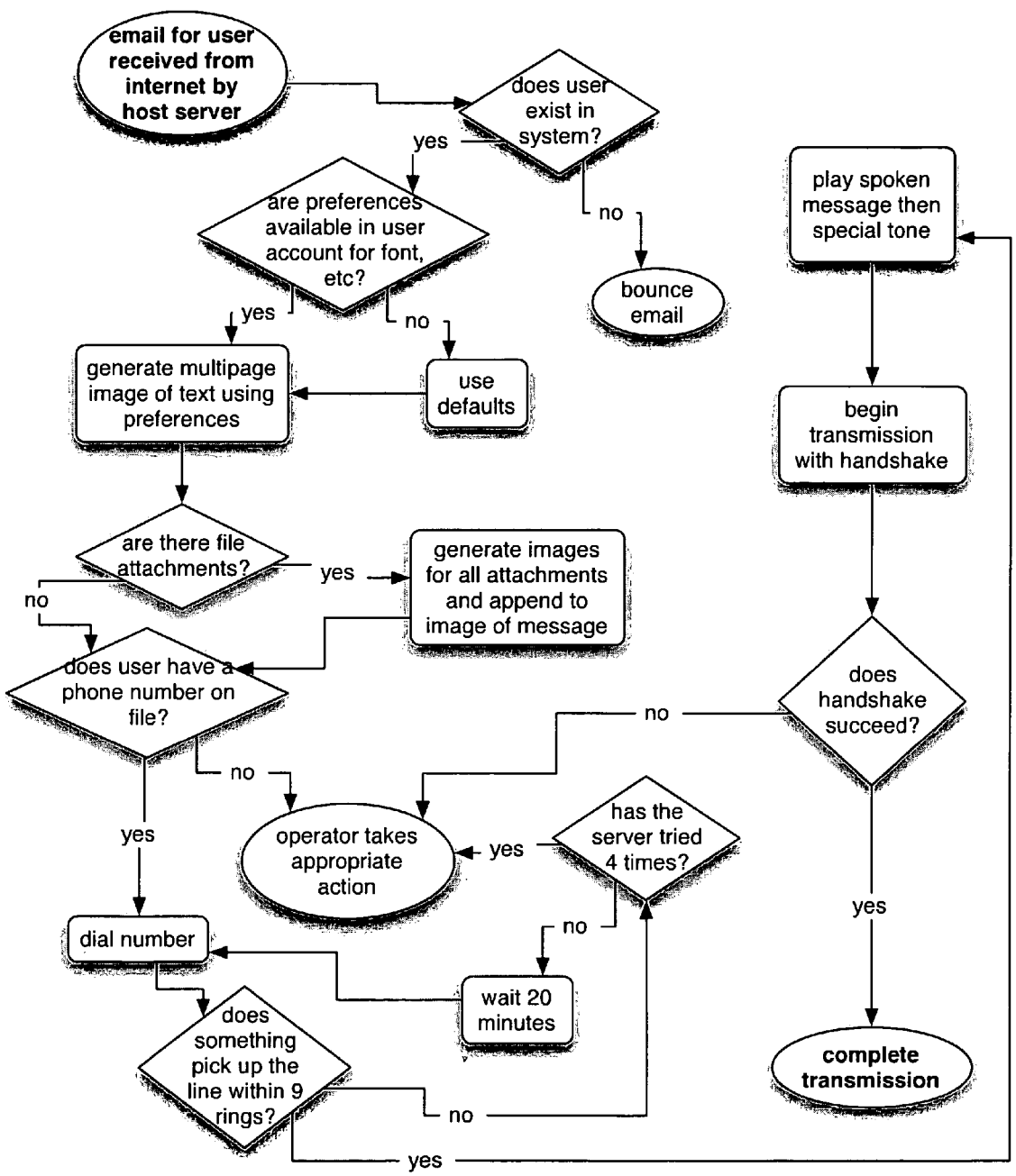

Receiving Messages:

If the host server 5 receives an e-mail addressed to a mail terminal user, the host server 5 can execute a program 19 illustrated in FIG. 19. Accordingly, when an e-mail addressed to a mail terminal user is received by the host server 5, the host server 5 first determines whether the addressee is a valid user in the system. If the addressee is not a valid user, the email is bounced to its sender. If the addressee is a valid user, the host server 5 looks up the preferences of the mail terminal user in its database and generates an image of the received e-mail using these preferences that is to be forwarded as a mail terminal message to the mail terminal user. If there are no preferences set in the database, the server uses global default values. Additionally, if the e-mail contains attached files, the host server generates images of said files and appends them to the message to be sent to the mail terminal.

The host server 5 also looks up the telephone number of the mail terminal user to whom the e-mail is addressed. If such a telephone number is not available, the host server 5 notifies the administrator, who can then take appropriate action. If such a telephone number is available, the number is dialed by the host server 5 and the host server 5 determines whether the call is picked up by some device. If the call is not picked up, the host server 5 waits a predetermined amount of time and retries the number. If the call is not picked up after a predetermined number of calling attempts, the host server 5 notifies the administrator, who can then take appropriate action.

If the call is picked up, the host server 5 plays a message instructing the user to hang up the phone if the user wishes to receive the incoming document. This is followed by a special tone signaling to the mail terminal that this call is an incoming message (and not a voice call).

At this point, the host server 5 exchanges a handshake with the answering device and determines from the handshake whether the answering device is an authorized mail terminal. If the answering machine is not a mail terminal, the host server 5 notifies the administrator, who can then take appropriate action. If the answering machine is a mail terminal, the transmission is completed by sending the image of the received e-mail to the mail terminal as a mail terminal message.

To receive messages from the host server 5, the microprocessor 26 of the mail terminal 2 executes a program 17 shown in FIG. 17. Accordingly, when the phone line to which the mail terminal 2 is connected rings, if caller-ID is available, the microprocessor 26 uses it to determine whether the incoming call is from the host server 5. If the microprocessor 26 determines that the incoming call is from the host server 5, the microprocessor 26 picks up the phone line immediately. If the microprocessor 26 does not determine that the incoming call is from the host server 5, and if the microprocessor 26 determines that the incoming call is from a number not associated with the host server 5, the microprocessor does nothing. If the microprocessor 26 does not determine that the incoming call is from the host server 5, and if the microprocessor 26 does not determine that the incoming call is from a number not associated with the host server 5, it waits for the user or another device to pick up the phone. When the user or other device picks up the line, the server plays a message to the user informing him that a message will print when he hangs up the phone. When the line is picked up, a special tone tells the microprocessor that the server is calling. It holds the line to receive the message which is sent within 10 seconds. Upon detection of this tone, it also sets the mode of the status light 13 to flashing green and disconnects from the phone line any answering machine or phone attached to the mail terminal via phone jack 23. Absence of a tone would tell the microprocessor that it was a voice call and it would hang up the line allowing the user or other device to handle the call.

After the server plays the message and tone, it exchanges a handshake with the mail terminal 2. If the microprocessor 26 determines from the handshake that the incoming call is not from the host server 5, the microprocessor 26 causes the mail terminal 2 to hang up and sets the mode of the status light 13 to steady green. On the other hand, if the microprocessor 26 determines from the handshake that the incoming call is from the host server 5, the microprocessor 26 causes the transceiver 28 to receive the message from the host server 5. If the voice alerts switch 22 on the terminal is enabled, the microprocessor issues a voice alert that a message has been received. The microprocessor 26 also sets the mode of the status light 13 to steady green. If the low-paper sensor 24 detects that the mail terminal 2 is out of paper, the microprocessor 26 sets the mode of the status light 13 to steady red and causes a voice alert to be played informing the user to refill the paper. Additionally, if the low-ink sensor 25 detects that the mail terminal 2 is out of ink, the microprocessor 26 sets the mode of the status light 13 to steady red and causes a voice alert to be played informing the user to change the ink.

Thereafter, the message is printed by the printer 29, and the status light 13 is set to steady green.

Sending Messages:

The mail terminal 2 need have no external buttons, knobs, or user input interfaces except for the envelope shaped slot 8. Thus, for example, a document may be automatically transmitted by the mail terminal 2 upon scanning of the document without the need to press a send button or to enter the telephone number of the host server 5. In this case, the telephone number of the host server 5 is pre-programmed into the mail terminal 2.

The telephone number of the host server 5 through which the mail terminal 2 communicates can be a 1-800 number or other toll free number such as a local call.

Figure 16:
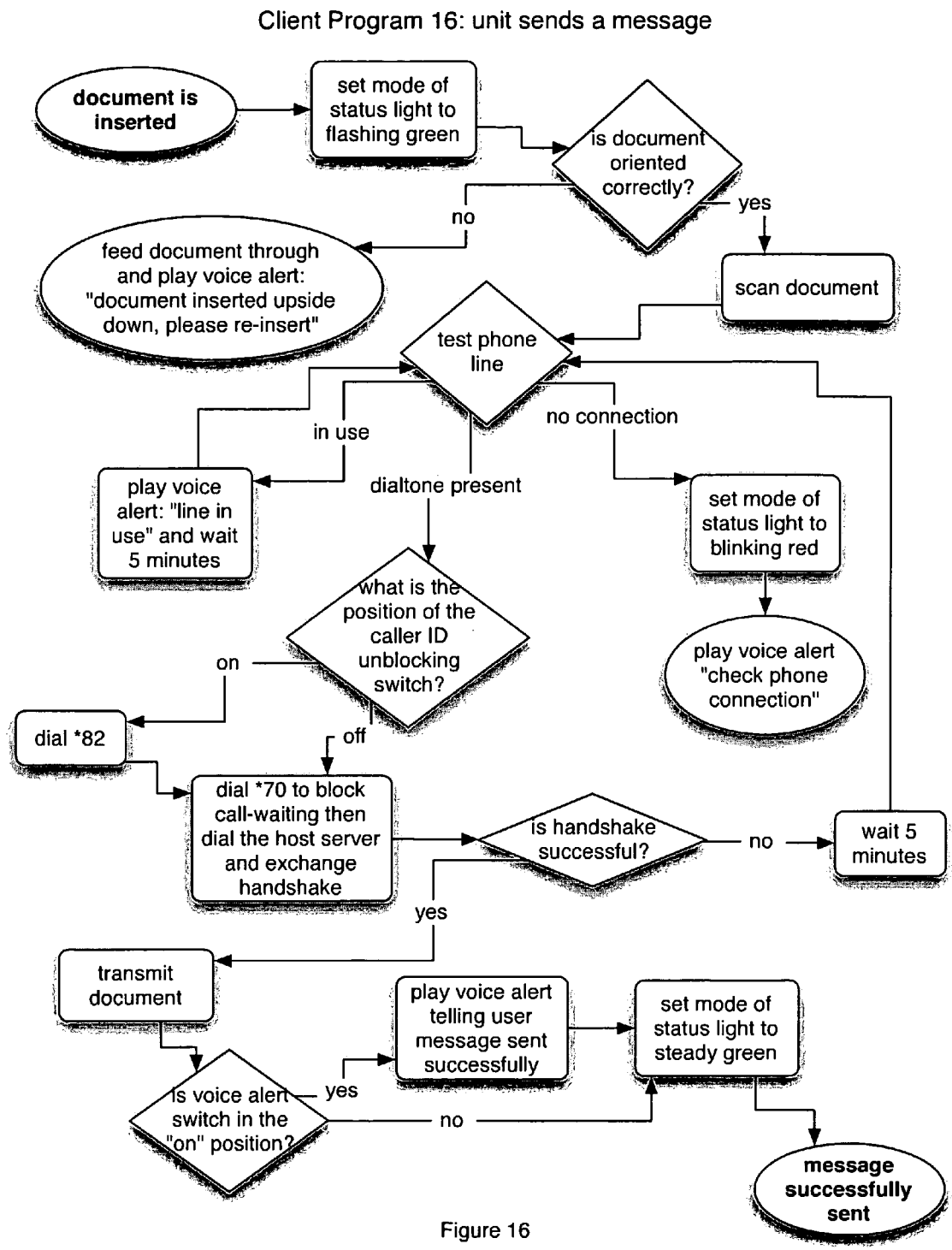

When the microprocessor 26 determines that a document has been inserted into the envelope shaped slot 8 by activation of the sensor 21, it executes a program 16 in FIG. 16 to send messages from the user through the host server 5 to the addressee. Accordingly, as shown in FIG. 16, the microprocessor 26 first sets the mode of status light 13 to flashing green. It then tests the document to determine whether the text, graphics, or other matter of the document is facing the scanner 27. For example, an LED/photodiode combination can be used to test the orientation of the document to ensure the correct side is being scanned. In the case of an improper orientation, the mail terminal 2 may be equipped with a voice chip to alert the user to the problem. If the document was fed into the envelope shaped slot 8 facing the wrong way, the mail terminal 2 issues a voice alert instructing the user to reinsert the document with the text or graphics side in the proper orientation. The microprocessor 26 then sets the mode of status light 13 to steady green. Alternatively, the terminal could send the document as inserted and let the host server 5 detect it. In such a configuration, if the host server 5 detected a blank page, it would alert an administrator who could call the user and instruct him to resend the document. In the case that the document is oriented correctly in the envelope shaped slot 8, the scanner 27 scans the document.

The microprocessor 26 then tests the phone line and waits if the phone is in use. If the phone line is not in use but there is no dial tone, the microprocessor 26 sets the mode of status light 13 to flashing red and causes a voice alert to be issued that directs the user to connect the mail terminal 2 to the wall phone jack. When the phone line connection is made, the microprocessor 26 sets the mode of status light 13 to flashing green and resumes the sending program. However, if there is a dial tone, the microprocessor 26 prepares to connect to the host server 5. It polls the position of the caller ID unblocking switch 20 located on the bottom of the unit. Users who have outgoing caller ID information blocked need to activate the caller ID unblocking switch 20. If the caller ID unblocking switch 20 is set to "on" the microprocessor 26 dials *82 to unblock caller ID for this call only. It then dials *70 to block call-waiting for the duration of the call and then the phone number of the host server 5. It then exchanges a special handshake with the host server 5. This handshake can be used by the host server 5 as a check that the mail terminal 2 is an authorized terminal and, thus, gives the administrator a measure of security that a user is a paying subscriber. If the handshake is not successful, the microprocessor 26 waits five minutes before checking the line and dialing once again.

When the handshake is completed, the terminal transmits the document to the host server 5. When transmission is complete, the microprocessor 26 sets the mode of status light 13 to steady green and polls the position of the voice alerts switch 22 on the back of the unit. If the voice alerts switch 22 is set to "on," the microprocessor 26 causes a voice alert to be played telling the user that the document was successfully sent and sets the mode of the status light 13 to steady green. If the voice alerts switch 22 is set to "off," the microprocessor 26 sets the mode of the status light 13 to steady green.

Figure 5:
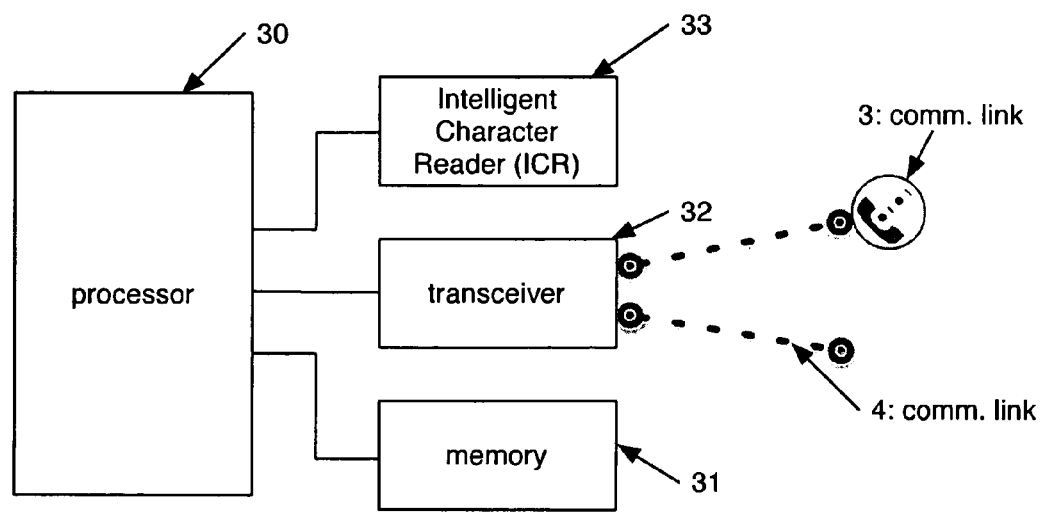
FIG. 5 illustrates the hardware and software components of the host server shown in FIG. 1.

As shown in FIG. 5, the host server 5 includes a processor 30, a memory 31, one or more transceivers 32, and several software modules including an intelligent character reader (ICR) 33.

The host server 5 can execute a number of program modules such as the program 19. For example, as shown in FIG. 18, the host server 5 can execute a program 18 when it receives a call from the mail terminal 2. Accordingly, when the host server 5 receives a call from the mail terminal 2 whose identity has been validated after a successful handshake, the host server 5 looks up the user's account based on the terminal's SSID (Service Set Identifier or Device-ID), assuming that the SSID is valid. The host server 5 then compares the phone number in the account information to the number from the caller ID of the incoming call. If no caller ID information is available, a message to the user of the mail terminal 2 is queued. This message instructs the user to enable caller ID unblocking via the caller ID unblocking switch 20. If caller ID information is available, the program proceeds. If the numbers are different, the host server 5 updates the records of the caller/user with the new number. If the numbers are the same, or after the host server 5 updates the records of the caller/user, the host server 5 continues with the receiving program.

When the transceiver 32 of the host server 5 receives a document from the mail terminal 2, the intelligent character reader 33 of the host server 5 implements intelligent character recognition (ICR) to find the addressee printed or written on the document. The addressee can be in the form of either an e-mail address (someone@somwhere.com) or a name (John Doe). The ICR begins at the top of the document and continues down the page until it finds a name or an email address. Once the host server 5 finds the address in a message, it need not read the characters in the remaining part of the message.

If the addressee is in the form of an e-mail address, the message is addressed to said address.

If the addressee is in the form of a name, the host server 5 compares the name to a database stored in the memory 31 for an associated e-mail address in the case where the addressee has a computer or for a phone number in the case where the addressee has a mail terminal similar to the mail terminal 2. Assuming that there is no doubt in the match found between the addressee's name on the received message and the addressee's name in the database, and assuming that the name on the message is the name of a user who also has a mail terminal 2, the telephone number associated with the addressee is looked up in the database, the message is addressed with this telephone number, and the message is delivered to the mail terminal 2 of this addressee using this telephone number. However, if the name on the message is not the name of a user who also has a mail terminal 2, the email address associated with the addressee is looked up in the database, the message is addresses with this email address, and the message is delivered to the computer of this addressee using this email address. Either way, the transceiver 32 of the host server 5 appropriately sends the message over the communication link 4 to the addressee as an image of the original handwritten or typewritten message to the address associated with the name printed or written by the user on the original document. If the message bounces, the message is presented to an operator who takes appropriate action.

If there is no addressee or the match between the addressee's name from the document and the corresponding name of the addressee in the caller/user's address book is in doubt (for example, the addressee's name does not appear in the address book, or the caller/user used only the first name of the addressee and there are more than one addressee with the same first name), or the handshake was not successful, or the message bounces, the relevant problem is presented to an administrator. For example, in the event that the addressee's name cannot be properly matched, a digital copy of only the portion of the document which was scanned by the intelligent character reader 33 is sent to the administrator who manually sends the message to the appropriate person. Only the scanned portion is sent to prevent the administrator from inadvertently viewing personal information.

If the administrator can resolve the problem based on available records, the administrator causes the message to be sent on to the addressee. In the event that the administrator cannot match a name, the voice telephone number of the caller/user is called to ask for a fuller identification of the intended recipient. The administrator then causes the message to be sent on to the addressee based on that identification. The administrator might also update the caller/user's address book as necessary.

In the case that the host server 5 receives several pages of a communication within a predetermined amount of time, the host server 5 may be arranged to assume that all pages are to be passed on to the same addressee. In other words, they are assumed to be a multi-page document In such circumstances, once the host server 5 has found an address on one page of the communication, it need not look for addressees on additional pages of the same addressee.

Figure 14:
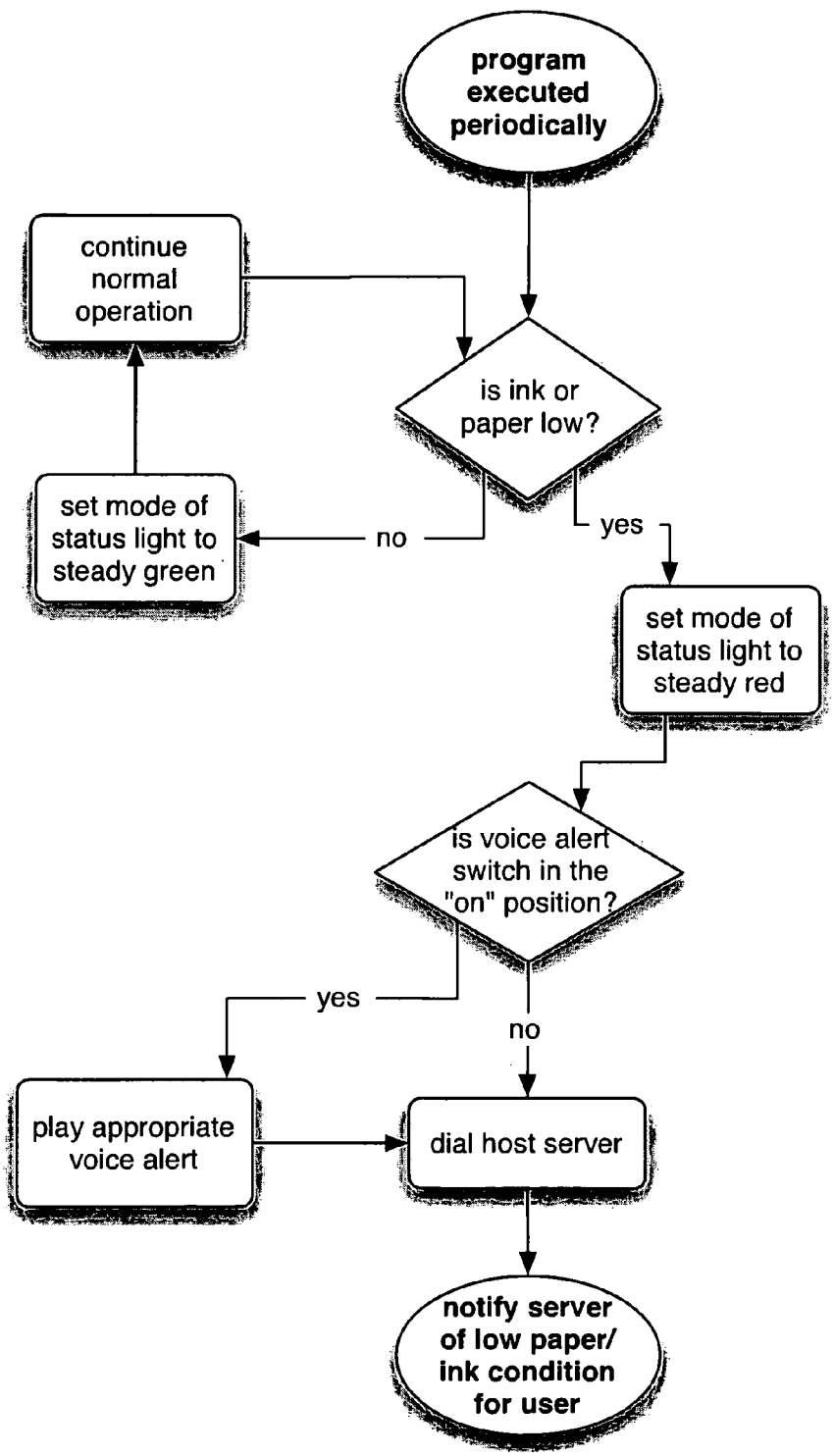

Additional Features:

The microprocessor 26 of the mail terminal 2 can execute a number of program modules, including those described above in connection with FIGS. 16 and 17. For example, as shown in FIG. 14, the microprocessor 26 can execute a program 14 that checks for paper in the inlet paper feeder 11, using the low-paper sensor 24 such as an optical sensor as described herein or another form of sensor. Accordingly, if the microprocessor 26 determines that the inlet paper feeder 11 is empty, the microprocessor will set the mode of status light 13 to steady red and dial the host server 5 to alert it to the condition. Based on the user's account settings, this may cause an operator to call the user or may cause an automatic shipment of a refill to the user. Also, based on the setting of the voice alerts switch 22 on the terminal, a voice alert can be given advising the user to replenish the stock of paper in the inlet paper feeder 11. The low-paper sensor 24 can be coupled to the microprocessor 26 for this purpose.

The program also allows the microprocessor 26 to check for ink in the mail terminal 2. Accordingly, if the microprocessor 26 determines that the ink supply is empty, the microprocessor will set the mode of status light 13 to steady red and dial the host server 5 to alert it to the condition. Based on the user's account settings, this may cause an operator to call the user or may cause an automatic shipment of a refill to the user. Also, based on the setting of the voice alerts switch 22 on the terminal, a voice alert can be given advising the user to replenish the ink. An low-ink sensor 25 can be coupled to the microprocessor 26 for this purpose.

Figure 15:
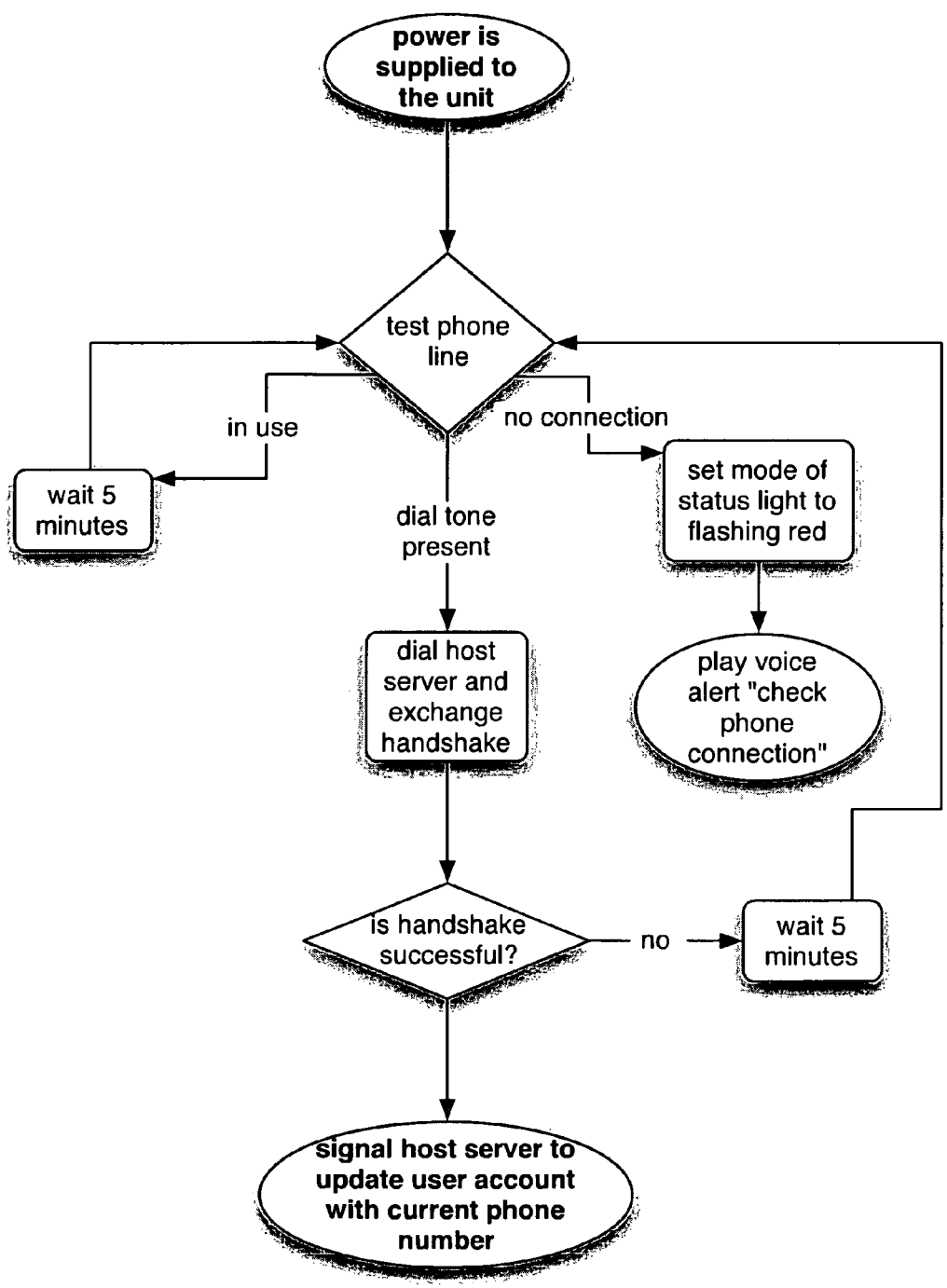

The microprocessor 26 of the mail terminal 2 also executes an auto-relocation recognition program 15 whenever power is disconnected and then reconnected in case the unit has been moved to a new phone number. This program also serves to print the user manual for the mail terminal when it is plugged in for the first time. As shown in FIG. 15, when power is supplied to the mail terminal 2, the microprocessor 26 tests the connection of the mail terminal 2 to a phone outlet. If it is in use, the microprocessor 26 waits five minutes before retrying. If there is no connection to a phone line, it sets the mode of status light 13 to flashing red and issues a voice alert to the user instructing the user to plug the phone line from the mail terminal 2 into a wall phone jack. If a dial-tone is present, the mail terminal 2 automatically dials the host server 5 and exchanges a handshake. If the handshake is successful, the connection is established. Once the mail terminal 2 is connected, a Service Set Identifier (SSID or Device-ID) is retrieved from the database of the host server 5. If this is the first time the mail terminal 2 has connected to the host server 5, the host server 5 queues a message to the mail terminal 2 which consists of the latest version of the user manual for the device and service. When the current operation is complete, this message is sent, causing the mail terminal 2 to print its own manual automatically. When the connection is established, if the number from which the mail terminal 2 is calling (as determined, for example, from caller ID) differs from the number that is stored in the database, the new number replaces the old in the database. However, if the user has blocked the out-going caller-ID, the auto-relocation recognition system may not work, in which case a message to the user is queued, instructing him or her to enable caller ID unblocking via the caller ID unblocking switch 20. Moreover, this Service Set Identifier (Device-ID) is used by the host server 5 as a check that the mail terminal 2 is an authorized terminal and gives the administrator a measure of security that the user is a paying subscriber.

Web Account Maintenance:

Individual user preferences can be defined by the user and stored in the memory 31 of the host server 5 and/or in memory of the mail terminal 2. These user preferences can be entered online in the case where the user or someone on behalf of the user has access to a computer and the Internet, or these user preferences can be entered by an administrator of the service who is reachable by telephone through a normal telephone call between the user and the administrator.

Figure 6:
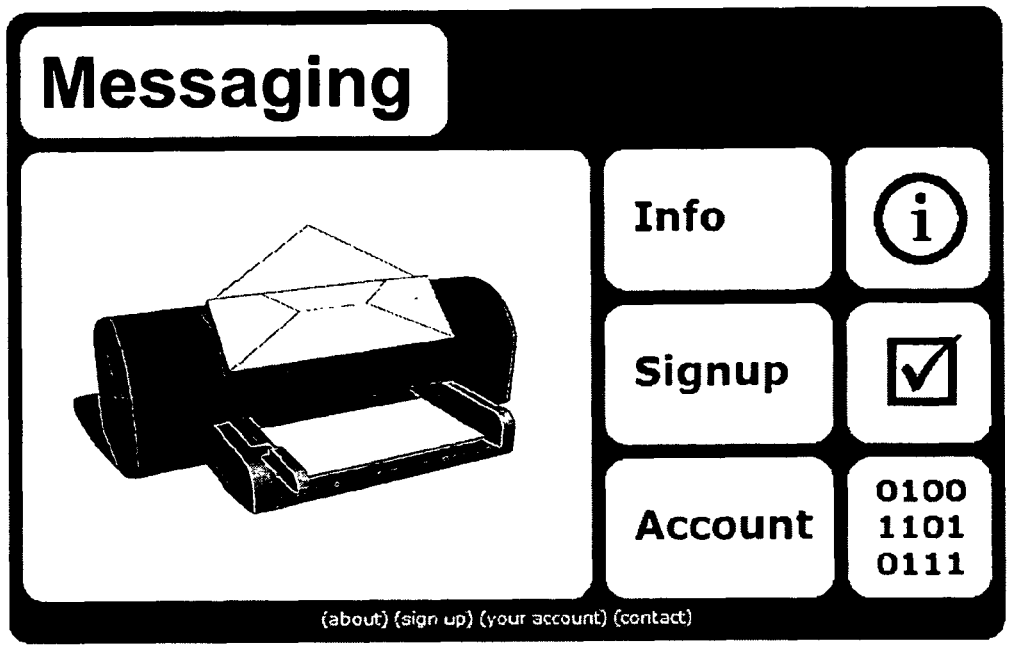

Accordingly, during initial user engagement of the service offered by the communication system 1 and/or during entry of user preferences by the user or the administrator, a screen 34 shown in FIG. 6 is first encountered. The screen 34 allows access to information, allows a user to sign up for the service, and allows entry of relevant account related to preferences, settings, and/or other information.

Figure 7:
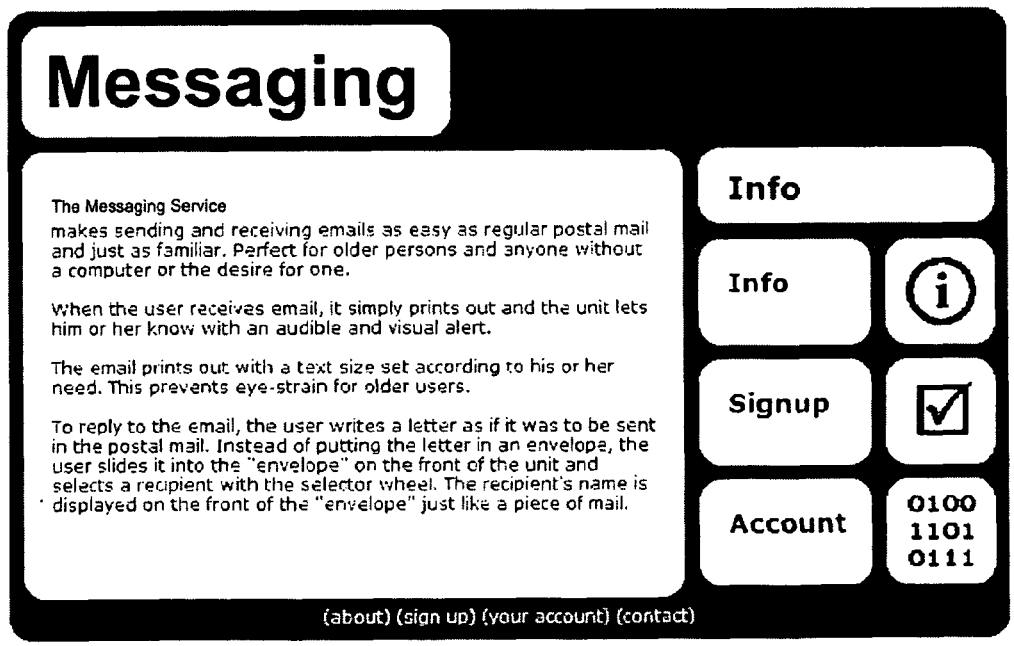

When the information button of the screen 34 is activated, a screen 35 shown in FIG. 7 is displayed to provide relevant information about use of the communication system 1.

Figure 8:
Figure 9:

When the signup button of the screen 34 is activated, screens 36, 37, and 38 shown in FIGS. 8, 9, and 10 are displayed in sequence for use in signing up for the service. When the signup button of the screen 34 is activated, the screen 36 is first presented. The screen 36 receives the identification of the user who is signing up for the service.

When the next button of the screen 36 is activated, the screen 37 is presented. The screen 37 receives the billing address of the user who is signing up for the service.

When the next button of the screen 37 is activated, the screen 38 is presented. The screen 38 is used to enter information related to the credit card though which the user signing up has chosen to pay for the service.

As indicated above, information is entered into the screens 36, 37, and 38 by the user directly, or by the administrator who receives the information by way of a telephone call or other communication with the user.

When the account button of the screen 34 is activated, screens 39, 40, and 41 shown in FIGS. 11, 12, and 13 are displayed in sequence to provide relevant information about the preferences and settings of the user of the service.

When the account button of the screen 34 is activated, the screen 39 is first presented. The screen 39 offers an edit profile button which permits the account profile of the user to be edited, an edit address book button which permits the user's address book to be created and/or edited, and preferences which, when selected, allow the user to be automatically notified if the mail terminal 2 is out of paper or ink. When the mail terminal 2 detects no paper in the inlet paper feeder 11 or a low-ink condition, it notifies the host server 5. Based on the user's setting on the host server, he or she can be called and notified of this condition.

Another option allows the user to specify whether or not the user wishes to automatically receive, via postal mail, refills of ink and paper for the mail terminal 2.

When the edit profile button of the screen 39 is activated, the screen 40 is presented. The screen 40 allows the user's account profile to be edited.

When the edit address book button of the screen 39 is activated, the screen 41 is presented. The screen 41 receives the address information related to the possible addressees to whom the user might direct messages. The address book contains the names of the possible addressees as well as the delivery instructions, e.g., e-mail addresses or terminal telephone numbers, according to which the messages are to be sent to the addressees. Accordingly, the name of each addressee to whom the user might want to send a message is stored in the address book. Stored with each name is a corresponding e-mail address, terminal telephone number, or other delivery instruction for the delivery of messages.

As the administrator guides the mail terminal user through the process depicted in FIGS. 6-13, or as the process depicted in FIGS. 6-13 is performed on-line by the user or by someone acting on behalf of the user, certain options can be selected. For example, the font size defaults to 14 point. However, the user may opt to increase or decrease this font size as desired. Because the term "14 point" may mean relatively little to a non-computer user, the option can be presented in other terms such as extra small, small, medium, large, or extra large.

Moreover, mail terminal users may not wish their phones to ring when they receive messages. A distinctive ring may be used to signal an incoming mail terminal message, prompting the mail terminal 2 to immediately pick up.

Enhancements:

Certain modifications of the present invention will occur to those practicing in the art of the present invention.

The mail terminal 2 can also be provided with a number of enhancements for the elderly, business users and others. For example, as shown in FIG. 20, a vitals monitor 42 can be plugged into the mail terminal 2 and can be arranged to alert friends, family, and/or authorities via phone, FAX, and/or email when an emergency occurs. The vitals monitor can be RF or otherwise coupled to sensors on the user to monitor vital signs of the user and to determine when those vital signals are out of range. Such vital signs, for example, may be pulse rate and blood pressure.

Furthermore, the mail terminal 2 can also be provided with an answering machine 43, a phone handset 44 which can be a speakerphone if desired, a numeric keypad for dialing, a computer printer interface, and/or a facsimile machine.

Additionally, rather than being devices that can plug into the mail terminal 2, the vitals monitor 42, the answering machine 43, the phone handset 44, the numeric keypad for dialing, the computer printer interface, and/or the facsimile machine can be integrated into the mail terminal 2.

Also, the mail terminal 2 can be configured with two scanners, one above and one below the document. These scanners would scan both sides of the document at once, allowing the user to send both sides without having to insert the page twice.

Moreover, the host server 5 may be arranged to apply a unique message identifier to each message that it sends to the mail terminal 2. The mail terminal 2 can then be arranged to add this message identifier to the document that it prints for the message and can be provided with a complementary message identifier reader such that, when the user scratches a reply message on the document, the mail terminal 2 scans both the message identifier and the reply message for transmission back to the host server 5. The host server 5 uses the message identifier to determine the address of the addressee of the reply message by looking up the sender of the message to which it is a reply. The message identifier may be in the form of a barcode or a string of other characters such as letters, numbers, and/or otherwise.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A phone mail server comprising:
   a receiver, wherein the receiver receives an electronic document over a telephone line;
   an intelligent character reader, wherein the intelligent character reader reads a recipient's name on the electronic document, and wherein the recipient's name is location independent;
   a processor, wherein the processor converts the name of the recipient read by the intelligent character reader to an address of the recipient; and,
   a transmitter, wherein the transmitter transmits the electronic document to the address of the recipient.

2. The phone mail server of claim 1 wherein the address of the recipient comprises an e-mail address of the recipient.

3. The phone mail server of claim 1 wherein the address of the recipient comprises a telephone number of the recipient.

4. The phone mail server of claim 1 wherein the phone mail server is arranged to notify an administrator when the phone mail server is unable to determine the address of the recipient.

5. The phone mail server of claim 1 wherein the phone mail server is arranged to receive an e-mail, to convert the e-mail to an image file, to determine a phone number of an addressee of the e-mail from a database, and to forward the image file to the phone number.

6. The phone mail server of claim 5 wherein the phone mail server is arranged to store user preferences of the addressee and to forward the image file to the phone number using the user preferences.

7. The phone mail server of claim 1 further comprising a memory, wherein the memory stores an address book containing a plurality of addressees and corresponding addresses, wherein the recipient's name is among the addressees, and wherein the recipient's address is among the addressees.

8. The phone mail server of claim 1 wherein the phone mail server is arranged to replace an old user terminal number in a database with a current user terminal number if the current user terminal number from which the user terminal is calling differs from the old number.

9. The phone mail server of claim 1 wherein the phone mail server is arranged to determine from a stored service set ID associated with a user terminal that the user terminal is authorized.

10. The phone mail server of claim 1 wherein the phone mail server is arranged to exchange a handshake with a user terminal.

11. The phone mail server of claim 1 wherein the phone mail server is arranged to receive a notification from a user terminal that the user terminal is out of ink and/or paper.

12. The phone mail server of claim 1 wherein the phone mail server is arranged to assume that all pages of a message received from a user within a predetermined amount of time are to be passed on to a common addressee.

13. The phone mail server of claim 1 wherein the processor is arranged to apply a unique message identifier to a message from a sender and to be forwarded to a recipient of the message.

14. The phone mail server of claim 1 further comprising transmitting a voice alert to the recipient to notify the recipient that the electronic document is being transmitted to the recipient.

15. The phone mail server of claim 1 wherein the document as received contains no predetermined indicator that designates the address as the address of the recipient.

* * * * *